May 13, 1930.                R. VALVERDE                1,758,417
              SYNCHRONOUS ELECTRIC MOTOR
                   Filed April 12, 1927
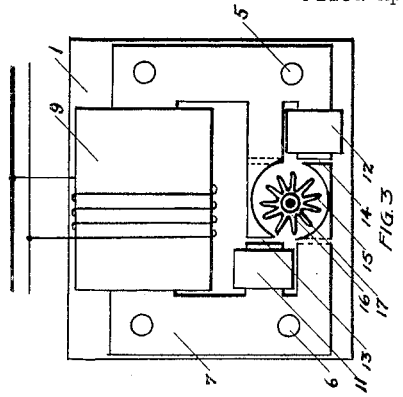
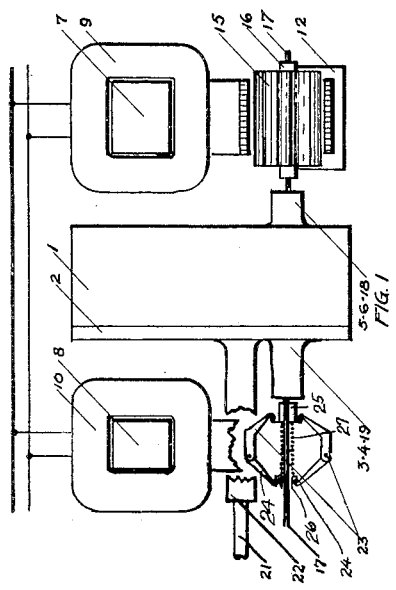
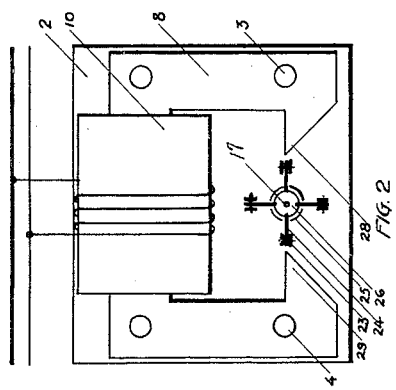
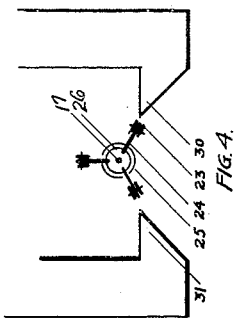
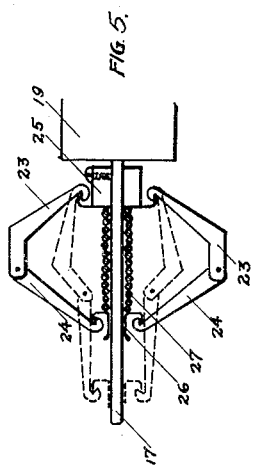
INVENTOR
BY
ATTORNEY Patented May 13, 1930

1,758,417

UNITED STATES PATENT OFFICE

ROBERT VALVERDE, OF NEW YORK, N. Y.

SYNCHRONOUS ELECTRIC MOTOR

Application filed April 12, 1927. Serial No. 183,106.

This invention relates to alternating current motors and more particularly to self-starting synchronous motors though it is noted that the invention is not necessarily limited to self-starting devices.

Theoretically it can be shown that the resultant lines of force in an elliptical field continuously change their direction to produce rotation in any object which, tending to retain these lines of force, is of itself free to rotate. The manner in which the field changes its direction by causing the magnetic flux to wax and wane in any instantaneous position makes it logical that the best path offered by such a rotor in this field be a tortuous one which will offer the greatest resistance to any change in the direction of the flux. The result is a rotor with a powerful starting torque. Practically, an ideal design for a powerful starting rotor would seek two objectives; first, a long magnetic path with a minimum leakage and second, a magnetic material of high retentivity.

Now a self-starting synchronous motor however strong its starting torque cannot start if the proper strength synchronous field is active at the time for starting. Design and construction of models have effectively shown under test that this is so if a rugged and reliable synchronous motor is the goal. I have found that by providing a synchronizing rotor which, in a few revolutions of the starting rotor—say five—can be brought into a dense field from a less dense field, the motor can be brought quickly into step to run with a strong synchronous torque.

Accordingly one of the most important objects of my invention is to provide a synchronous motor with two rotors mechanically direct connected, one being a self-starting rotor, the other being a synchronizing rotor. Another object of my invention is to provide a motor with an induction type starting rotor which rotates in the well-known two pole split phase field using special pole tips, and a synchronizing rotor rotating asymmetrically in the ordinary two pole single phase field; both rotors being mounted on the same shaft.

Still another object is to provide a starting rotor formed as a fluted strip and made of hardened steel, and a synchronizing rotor connected to the starting rotor and consisting of steel links capable of movement into a dense field under the action of centrifugal force.

Still other objects of the invention will appear as the description proceeds.

The inventive features for the accomplishment of these and other objects are shown herein in connection with an improved motor which briefly stated, includes a shaft carrying a self-starting rotor and a synchronizing rotor, the shaft being mounted in a non-metallic gear casing placed between the fields of each rotor; the starting rotor being a fluted strip of hardened steel joined at its ends to form an eleven point star mounted on a copper sleeve which in turn fits on the shaft and is subject to a rotating magnetic field, the synchronous rotor consisting of pairs of steel links the end of one attached to a sliding collar and one end of the other link of the pair attached to a fixed collar on the shaft; a spring between the collars keeping the linked pairs close to the shaft before starting and subject to a single phase synchronous field.

This general description and the subsequent theory of the invention may be more clearly understood by the following detailed description of the accompanying drawings of a model of one type of this motor, in which—

Fig. 1 is a side elevation showing the energizing field circuit, the shielding gear case and both starting and synchronizing rotors with their fields.

Fig. 2 is a front elevation showing the synchronizing rotor in running position, namely, with the links extended.

Fig. 3 is a rear elevation showing the split phase starting field with diagonally slotted pole tip air gaps, and the fluted sheet steel rotor.

Fig. 4 shows the offset pole type of synchronous field having a three link rotor.

Fig. 5 is an enlarged view of the synchronizing rotor showing two sets of links in the running position and in the standstill position, the latter in dotted lines.

The gear box 1 with cover 2 is the base about which the motor is built. To this base is attached thru suitable bosses 3—4 and 5—6 the starting field core 7 and the synchronous field core 8, these cores energized by the coils 9 and 10 respectively. The coils are connected in parallel to the sources of power as indicated by the wiring.

The starting field is made split phase by the one turn shading coils 11 and 12.

These coils are located on alternate poles near the diagonally slotted pole tip air gaps 13 and 14.

The rotor 15 is formed of a strip of thin sheet steel bent in a zig-zag manner to produce a fluted strip. The ends are welded together to form a cylinder of star shaped cross-section and subsequently hardened. To magnetically insulate opposite rays of the star from each other the rotor is mounted on a copper sleeve 16 which fits snugly on the shaft 17.

This shaft 17 has end play and rotates in the gear case bearings 18 and 19 which are in line with the bosses 3—4 and 5—6.

On the other end of the shaft 17 is mounted the synchronizing rotor which comprises sets of links 23—24 suitably attached to a fixed collar 25 and at the other end a movable collar 26. The two collars are kept apart by the spiral spring 27. The face of links 23 will effectively clear pole tips 28—29.

These link sets are symmetrically arranged in any number around the shaft so that the resultant centrifugal force in the plane of rotation is zero, that is, no unbalanced force to cause vibration.

For special starting purposes I discovered the novel arrangement of pole tips 30—31 so placed as to be adjacent to two apices of the three-linked rotor Fig. 4, and thus a line thru the pole tips will not pass thru the shaft centerline.

The operation of this motor is as follows:

Applying voltage at 110 volts and 60 cycles causes the starting rotor to reach synchronous speed in about five revolutions. This is possible due to the relatively small inertia of both rotors. After about the third revolution the synchronizing rotor links are suddenly expanded into the dense single phase field. When the motor starts to pass thru synchronous speed the synchronizing rotor pulls the system into step and thereafter serves to keep the induction end down to speed.

A six per cent plus or minus change in frequency will be followed without losing step.

If the voltage fails the system quickly comes to rest, ready to repeat the cycle. If failure is for an instant the loss in step is for an even shorter period until the starting rotor pulls the system up to synchronism again, and is prevented from passing this speed by the synchronizing rotor.

I would state in conclusion that while the motor here shown is a practical embodiment of my invention I do not limit myself to the exact details since manifestly with a rugged motor of this type the design can be varied to suit much larger sizes without departing from the spirit of the invention as defined in these claims.

Having thus described my invention, what I claim and desire to protect by Letters Patent is:

1. A self starting synchronous motor comprising, a fluted rotor having a strong starting torque mechanically connected on a common shaft to a synchronizing rotor, means associated with said synchronizing rotor to subject it to centrifugal force during operation to develop strong synchronous characteristics when near and below synchronous speed.

2. In a self-starting synchronous motor including means for producing a rotating magnetic field, an induction starting rotor comprising a sheet of hardened steel ribbon substantially corrugated to form a fluted star shaped cylinder thereby to offer an elongated and tortuous magnetic path thru the interpolar space of said magnetic field.

3. In a self-starting synchronous motor, means for producing a rotating magnetic field, a shaft associated therewith a non-magnetic sleeve mounted on said shaft and a fluted star shaped starting rotor mounted on said sleeve.

4. A self starting synchronous motor comprising in combination, a casing, a shaft rotatably associated therewith, a self starting fluted rotor mounted on said shaft and adapted to rotate said shaft, a synchronizing rotor mounted on said shaft, means for producing a single phase magnetic field associated with said casing and subjecting said synchronizing rotor to its action, two pole tips associated with said field producing means disposed adjacent said synchronizing rotor and so arranged relative thereto as to be asymmetrical with regard to the said rotor.

5. A self starting synchronous motor including in combination, a shaft, cooperating means associated with said shaft to produce rotation of said shaft, a fixed sleeve and movable sleeve associated with said shaft a spring associated with said shaft to keep said sleeves apart, articulated members associated with said fixed and movable sleeves and adapted to be moved relative to one another upon motion of said shaft, a single phase field associated with said casing and cooperating with said articulated members to produce synchronized rotation of said shaft.

6. In a self starting synchronous motor including means for producing a rotating magnetic field, a starting rotor comprising a metal ribbon fluted body forming a plurality of contiguous arms on said rotor subject to the action of said field, the said rotor being mounted upon a non-magnetic sleeve, said sleeve being fixedly mounted on said shaft thereby offering an elongated magnetic path from one pole to the opposite pole of said magnet.

7. In a self starting synchronous motor including means for providing a rotating magnetic field, a starting motor having a shaft comprising a hardened steel ribbon fluted to form a plurality of contiguous arms thereon, the said rotor being mounted non-magnetically upon said shaft thereby offering an elongated magnetic path from one pole to the opposite pole of said magnet.

8. A motor of the class described comprising a casing, a magnet having poles associated therewith, a shaft rotatably mounted in said casing, a synchronizing rotor thereon adjacent said poles having a plurality of pivoted expandible members thereon, means for normally keeping the said members in contracted position to present a minimum of inertia upon starting rotation of the rotor, said members adapted to expand into the dense field near the pole ends of said magnet upon rotation of said shaft.

9. A motor of the class described comprising a casing a pair of field magnets each having poles associated therewith, a shaft rotatably mounted in said casing, a fixed starting rotor on one end of said shaft, and a synchronizing rotor on the opposite end of said shaft, each of the same being associated with one of each of said magnets adjacent the poles, the starter rotor comprising a hardened sheet of steel strip substantially corrugated to form a fluted rotor joined at all its ends, thereby to offer an elongated magnetic path within the space between the pole ends of the starting rotor magnet, and the synchronizing rotor having expandible magnetic elements thereon.

10. A motor of the class described comprising a casing, a pair of field magnets having poles associated with said casing, a shaft rotatably mounted in said casing, a starting rotor on one end of said shaft, and a synchronizing rotor on the opposite end of said shaft, each of the same being associated with one of each of said magnets adjacent said poles, the starting rotor comprising a hardened sheet of steel strip substantially corrugated to form a fluted rotor joined at all its ends thereby to offer an elongated magnetic path within the space between the pole ends of the starting rotor magnet, and the synchronizing rotor including expandible steel links.

11. A motor of the class described comprising a casing, a shaft associated with and extending externally on opposite sides of said casing, a pair of field magnets having poles mounted in operative relation with said shaft and associated with said casing, a fluted starting rotor mounted on one end of said shaft, and a synchronizing rotor mounted on the opposite end of said shaft, both said rotors being mounted relatively to the pole end of said magnets, said synchronizing rotor comprising a plurality of pivotally connected links concentrically spaced about said shaft, a fixed collar on said shaft pivotally engaging one end of said links, a movable collar adjacent thereto also pivotally attached to said links, and a resilient means between both said collars, said links being adapted to expand and contract at predetermined rotative speeds of said shaft.

12. In a motor of the class described a casing, a shaft mounted therein for rotation, a synchronizing rotor mounted on said shaft comprising a plurality of pivotally articulated links, a fixed collar for pivotally mounting one end of said articulated links, a second associated collar movably mounted upon said shaft and pivotally connected to the opposite end of said links, and a means for keeping the said links in normally non-expanded position when the shaft is at rest, said links adapted to expand when the shaft is in operation.

Signed at New York in the county of New York and State of New York this 11th day of April, A. D. 1927.

ROBERT VALVERDE.